United States Patent [19]
Nakayama et al.

[11] Patent Number: 5,989,671
[45] Date of Patent: Nov. 23, 1999

[54] OPTICAL RECORDING MEDIUM AND MANUFACTURING METHOD THEREOF

[75] Inventors: Junichiro Nakayama, Nara-ken; Hiroyuki Katayama; Akira Takahashi, both of Nara; Kenji Ohta, Nara-ken; Kazuo Van, Hara, all of Japan

[73] Assignee: Sharp Kabushiki Kaisha, Osaka, Japan

[21] Appl. No.: 08/879,916

[22] Filed: Jun. 20, 1997

Related U.S. Application Data

[63] Continuation of application No. 08/461,164, Jun. 5, 1995, Pat. No. 5,674,583, which is a continuation of application No. 07/614,935, Nov. 16, 1990, abandoned.

[30] Foreign Application Priority Data

Nov. 22, 1989 [JP] Japan .................................. 1-303739
Nov. 27, 1989 [JP] Japan .................................. 1-308699
Nov. 27, 1989 [JP] Japan .................................. 1-308700

[51] Int. Cl.$^6$ ........................................................ G11B 5/60
[52] U.S. Cl. ........................ 428/64.3; 428/694 ML; 428/694 DE; 428/694 MT; 428/694 RL; 428/300; 369/13; 369/275.1; 369/278; 369/279; 369/283; 360/114
[58] Field of Search ................................... 369/13, 275.1, 369/278, 279, 283; 360/114; 428/64.3, 694 ML, 694 DE, 694 MT, 694 RL, 300

[56] References Cited

U.S. PATENT DOCUMENTS

| 4,645,722 | 2/1987 | Katayama et al. ............. 428/694 ML |
| 4,678,271 | 7/1987 | den Brueder et al. ................. 385/134 |
| 4,711,815 | 12/1987 | Yoshiike et al. ..................... 428/411.1 |

(List continued on next page.)

FOREIGN PATENT DOCUMENTS

| 0014227 | 8/1980 | European Pat. Off. . |
| 288069 | 10/1988 | European Pat. Off. . |
| 304873 | 3/1989 | European Pat. Off. . |

(List continued on next page.)

OTHER PUBLICATIONS

English Abstract of Toshiba et al., JP–A–60–70543 (Apr. 22, 1985), Patent Abstracts of Japan 9(210), p. 383 (1985).
English Abstract of Kogyo et al., JP–A–59–223967 (Dec. 15, 1984), Patent Abstracts of Japan 9(97), p. 352 (1985).
English Abstract of Masataka Ito, Jp–A–1–112552 (May 1, 1989), Patent Abstracts of Japan 13(353), p. 913 (1989).
English Abstract of JP–A–54–143116 (Nov. 8, 1979) from World Patent Index/Derwent.
English Abstract of K. Yoshiteru, JP–A–57–120255 (Jul. 27, 1982), Patent Abstract Japan 6(217), p. 152 (1982).

(List continued on next page.)

*Primary Examiner*—Leszek Kiliman
*Attorney, Agent, or Firm*—David G. Conlin; Peter F. Corless; Dike, Bronstein, Roberts & Cushman, LLP

[57] ABSTRACT

An optical tape including an optical recording layer for permitting information to be optically recorded thereon and a light-reflective magnetic layer. The light-reflective magnetic layer which reflects light projected onto the recording layer, also permits magnetic recording or magneto-optical recording to be performed thereon, thereby increasing a storage capacity of the optical tape remarkably. Further, the optical tape is provided with a layer to form guiding grooves for tracking control. The layer to form guiding grooves is made up of ultraviolet-hardening resin, photo-resist, or a photochromic material. For example, in the case of using ultraviolet-hardening resin, after a guiding groove pattern has been exposed by projecting an ultraviolet ray on a layer made up of ultraviolet-hardening resin, the exposed areas harden to form areas corresponding to guiding grooves between those exposed areas. The guiding grooves are formed by removing the areas corresponding to guiding grooves from the layer made up of the ultraviolet-hardening resin. Additionally, along with a guiding groove pattern, an index pattern can also be exposed. The guiding grooves thus formed do not reduce the recording density for information of the optical tape.

17 Claims, 4 Drawing Sheets

U.S. PATENT DOCUMENTS

| | | | |
|---|---|---|---|
| 4,725,502 | 2/1988 | Kiyomiya | 428/457 |
| 4,839,883 | 6/1989 | Nagata et al. | 369/286 |
| 4,908,813 | 3/1990 | Ojima et al. | 369/94 |
| 4,922,454 | 5/1990 | Toki | 365/122 |
| 5,061,582 | 10/1991 | Brettle et al. | 430/19 |
| 5,075,145 | 12/1991 | Yamamoto et al. | 428/64.3 |
| 5,089,358 | 2/1992 | Taki et al. | 428/694 DE |

FOREIGN PATENT DOCUMENTS

| | | |
|---|---|---|
| 0312339 | 4/1989 | European Pat. Off. . |
| 2546941 | 4/1976 | Germany . |
| 3741910A1 | 6/1988 | Germany . |
| 140536 | 11/1981 | Japan . |
| 57-64343 | 4/1982 | Japan . |
| 60-258743 | 12/1985 | Japan . |
| 62-147455 | 7/1987 | Japan . |
| 63-11933 | 1/1988 | Japan . |
| 63-117326 | 5/1988 | Japan . |
| 204526 | 8/1988 | Japan . |
| 276732 | 11/1988 | Japan . |
| 42044 | 2/1989 | Japan . |
| 107352 | 4/1989 | Japan . |
| 148590 | 6/1989 | Japan . |
| 192040 | 8/1989 | Japan . |
| 1516413 | 7/1978 | United Kingdom . |
| 446835 | 5/1986 | United Kingdom . |
| 2189926 | 11/1987 | United Kingdom . |

OTHER PUBLICATIONS

English Abstract of Fumio et al., JP–A–1–064138 (Mar. 10, 1989), Patent Abstracts of Japan 13(271), p. 889 (1989).

S. Maslowski, *Applied Optics*, 13(4):857–860 (1974).

I. Bennion et al., *The Radio and Electronic Engineer*, 53(9):313–320 (1983.

OPTICAL RECORDING MEDIUM AND MANUFACTURING METHOD THEREOF

This is a continuation of application Ser. No. 08/461,164 now U.S. Pat. No. 5,674,583 filed on Jun. 5, 1995, which is a continuation of U.S. Ser. No. 07/614,935, filed Nov. 16, 1990 now abandoned.

FIELD OF THE INVENTION

The present invention relates to an optical recording medium such as an optical disk, optical card, or optical tape on or from which optical recording/reproduction is performed and more particularly to an optical recording medium having its storage capacity increased by providing the joint use of optical recording and magnetic recording.

BACKGROUND OF THE INVENTION

Conventionally, various optical disks for providing optical recording and/or reproduction such as those of read-only type, that is, so-called compact disks and the like, of DRAW type capable of writing desired information only once and of rewritable type have been known. Among those optical disks, in those of the type such as read-only type, which record information by the use of pits physically provided thereon, so-called tracking control is performed by directing a light beam onto the center of a pit row. On the other hand, in magneto-optical disks and the like which record information without using such pits physically recorded, tracking control is provided, in general, by installing guiding grooves with a rectangular shape in their cross-section, indicating a recording path of information, preliminary formed on a substrate.

In those optical disks described above, detection of information is performed based on a reproduced light transmitted through a recording layer or on a reflected light obtained by allowing a reproduced light transmitted through a recording layer to reflect from a reflective layer properly disposed. For example, a metal film made of Al or the like is employed as the reflective layer in a magneto-optical disk where reflection-type detection is performed.

In the mean time, recently studies on optical cards and so-called optical tapes have been carried out to provide an optical memory medium other than optical disks. In those optical cards and optical tapes, recording and/or reproduction is performed by utilizing the same principle as the optical disks. For example, an optical tape is basically composed of an elongated film substrate, an optical recording layer provided on the film substrate, on which recording of information is performed by utilizing the magneto-optical effect, photochromism, etc. and a protective layer for protecting the optical recording layer.

For those optical tapes, the following arrangement is suggested as in the case of magnetic tapes for VTR (Video Tape Recorder): an optical tape is stored in a cassette case; a portion thereof is taken out from the cassette case to be brought into an operative position for recording or reproduction; tracks as paths for information recording are predeterminately set in a direction slanting to the longitudinal direction of the optical tape so as to permit recording and/or reproduction.

Meanwhile, in those optical tapes, since a substrate thereof is generally thin as well as flexible, it is extremely difficult to form on the substrate guiding grooves for providing tracking control. Hence, a method for providing tracking control for optical tapes is disclosed, for example, in Japanese Patent Laid-Open Publication No. 63-117326 (117326/1988).

The system described therein provides straight guiding patterns which are optically recorded on a recording layer prior to recording operation, being predeterminately disposed in positions parallel to and adjacent to actual tracks, and performs recording and reproduction in parallel with the guiding patterns while reproducing the guiding patterns.

In the mean time, the above-mentioned optical recording medium generally enables high recording density for information, and therefore has a comparatively large storage capacity, yet it is desired to further increase the storage capacity with the thought of using the medium for long-time recording of music information and video information or enabling, for example, double recording etc. of information in order to prevent losing of information due to external causes.

However, for the above-mentioned method, it is necessary to additionally install a light source for recording the guiding patterns, another light source for reproducing the guiding patterns, a photodetector and so on in addition to a light source, a photodetector, etc for recording or reproducing information on or from the optical tape. Therefore, the arrangement presents problems that the number of parts of optical head for optical tapes is increased, the cost becomes high, and the recording density of information is lowered due to the fact that the guiding patterns are recorded on the recording layer in addition to information.

SUMMARY OF THE INVENTION

It is an object of the present invention to provide an optical recording medium having its storage capacity remarkably increased, by enabling optical recording as well as magnetic recording to be performed on the same optical recording medium.

In order to achieve the above object, the optical recording medium in accordance with the present invention comprises an optical recording layer on which information is optically recorded and a layer from which a light beam projected to the recording layer is reflected and on which magnetic recording is performed. With the arrangement, since optical recording as well as magnetic recording is possible solely by the use of one optical recording medium, its storage capacity is remarkably increased.

Moreover, it is another object of the present invention to provide guiding grooves for tracking control on an optical recording medium without reducing recording density of information.

In order to achieve the above object, the optical recording medium in accordance with the present invention is characterized in that a layer for forming the guiding grooves is formed, separated from the recording layer on which information is optically recorded. The guiding grooves are formed by a guiding groove shaping material. More specifically, after having exposed a guiding groove pattern on a layer of the guiding groove shaping material, a portion thereof corresponding to the guiding grooves is removed from the layer, thereby forming desired guiding grooves. With the arrangement, it is possible to form the guiding grooves on the optical recording medium precisely and easily without reducing recording density for information.

For a fuller understanding of the nature and advantages of the invention, reference should be made to the ensuing detailed description taken in conjunction with the accompanying drawings.

BRIEF DESCRIPTION OF THE DRAWINGS

FIGS. 1 to 10 describe the present invention in detail.

FIG. 1 is a schematic vertical sectional view showing an optical tape of a first embodiment of the present invention.

FIG. 2 is a schematic vertical sectional view showing an optical tape of a second embodiment of the present invention.

FIG. 3 is a schematic vertical sectional view showing an optical tape of a third embodiment of the present invention.

FIG. 5 is a schematic plan view showing the optical tape in the middle of its fabricating processes.

FIG. 6 is a perspective view showing an exposure device for exposing a guiding groove shaping layer.

FIG. 7 is a schematic vertical sectional view showing a modified example of an optical tape wherein a reflective layer is formed between a recording layer and a protective layer.

FIG. 8 is a schematic vertical sectional view illustrating the optical tape wherein guiding grooves are formed.

FIG. 9 is a schematic plan view illustrating the optical tape wherein a guiding track pattern is formed.

FIG. 10 is a schematic vertical sectional view of a modified example of the optical tape of FIG. 8 wherein a reflective layer is formed between a recording layer and a protective layer.

DESCRIPTION OF THE EMBODIMENTS

Figure 1:
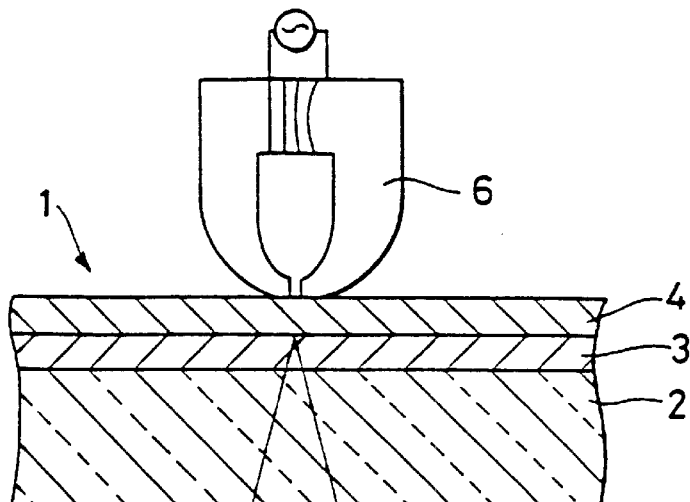

The following description will discuss one embodiment of the present invention referring to FIG. 1.

An optical tape 1 as one example of optical recording media is provided thereon with a film substrate 2 (with a thickness of substantial 5 $\mu$m to 100 $\mu$m) made of flexible polymeric resin with light transmission and heatproof characteristics, such as polyethylene terephthalate. On the substrate 2 is formed an optical recording layer 3 made of a photochromic material such as spiropyrane or fulgide by means of spattering, vapor deposition, or coating. Further, on the optical recording layer 3 is formed a light-reflective magnetic layer 4 made of CoCr or the like.

With the above structure, in recording on the optical recording layer 3, desired information can be recorded thereon by allowing a light beam projected from a laser (not shown) to be converged onto the optical recording layer 3 from the substrate 2 side through a converging lens 5 and thus by changing refractive index of the light-converged portion.

Moreover, in reproducing information recorded on the optical recording layer 3, reproduction can be performed by receiving a light reflected from the light-reflective magnetic layer 4 by a photodetector (not shown) after applying a light beam with a wave length or a luminous intensity by which no information can be recorded onto the optical recording layer 3.

On the other hand, magnetic recording and reproduction to be applied to the light-reflective magnetic layer 4 are performed by a magnetic head 6 disposed at the side of the light-reflective magnetic layer 4.

As described above, by recording information individually on the optical recording layer 3 and the light-reflective magnetic layer 4, a storage capacity of the optical tape 1 can be increased more than that of the conventional one.

Here, the following description will discuss an example of effective use of the optical tape 1 with the above-mentioned structure. For example, such an application of the optical tape 1 is preferable that data for computers are recorded on the optical recording layer 3 of the optical tape 1 while music information, video information, or the like is recorded on the light-reflective magnetic layer 4. With the application, although a recording/reproduction device for use with a photochromic medium is necessary in recording or reproduction of data for computers, magnetic recording/ reproduction devices such as magnetic tape cassette units that the users already have can be used in recording or reproduction of music information, video information or the like.

Another example of its application is proposed, wherein, for example, secret codes are preliminarily recorded on both of the respective optical recording layer 3 and light-reflective magnetic layer 4, and unless those secret codes are decoded, recorded information can not be read out. Thus, the application can increase reliability against stealing data.

As still another example of its application, it is suggested that the same information should be recorded on both the optical recording layer 3 and the light-reflective magnetic layer 4. In that case, if information recorded on the optical recording layer 3 should be lost by light mistakenly applied on the optical recording layer 3 due to an external cause, the information still remains on the light-reflective magnetic layer 4, while if information recorded on the light-reflective magnetic layer 4 should be lost by a magnetic field mistakenly applied on the light-reflective magnetic layer 4, the information still remains on the optical recording layer 3. Thus, reliability for preserving information can be increased.

Additionally, besides the above-mentioned applications, it is obvious that data for computers may be recorded on both the optical recording layer 3 and the light-reflective magnetic layer 4, or music information, video information or the like may be recorded on both the optical recording layer 3 and the light-reflective magnetic layer 4.

In the fist embodiment, the optical recording layer 3 is formed of a photochromic material, yet in lieu of the structure, the optical recording layer 3 may be made up of a material such as that of the so-called phase change type, DRAW type, or other type.

Moreover, in the first embodiment, the optical tape 1 is used as the optical recording medium, yet in a like manner, an optical disk or optical card composed of a substrate 2, an optical recording layer 3 and a light-reflective magnetic layer 4 may be employed. For example, in the case of fabricating the optical disk, the substrate 2 as a base plate may be formed of PC [Polycarbonate], APO [Amorphous Polyolefin], or PMMA [Polymethyl Methacrylate], having a thickness of substantial 0.3 mm to 1.5 mm.

Figure 2:
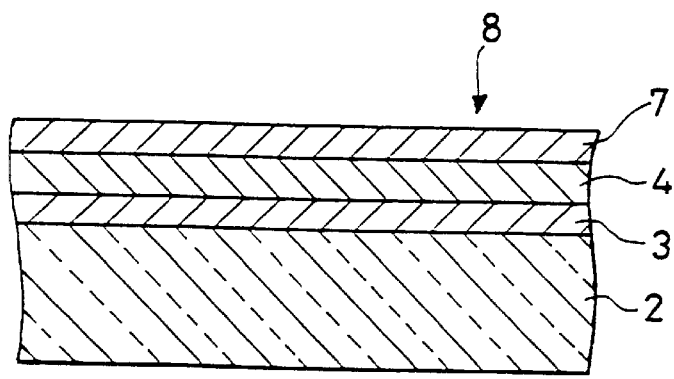

Next, the following description will discuss a second embodiment referring to FIG. 2.

The second embodiment provides an optical tape 8 wherein another optical recording layer 7 is formed on the light-reflective magnetic layer 4 of the first embodiment. In addition, those of the members having the same functions and described in the first embodiment are indicated by the same reference numerals and the description thereof is omitted.

The optical recording layer 3 or 7 may be formed of photochromic material. Moreover, it is preferable to make a thickness of the optical recording layer 7 as thin as possible, for example, not more than 1 $\mu$m.

With the above structure, recording of information onto the optical recording layer 3 is performed by projecting a light beam emitted from a laser (not shown) onto the optical recording layer 3 from a substrate 2 side through an objective lens (not shown), while reproduction of information from the optical recording layer 3 is performed by projecting on the optical recording layer 3 a light beam with a luminous intensity and a wavelength by which no information can be recorded on the optical recording layer 3 and by utilizing a resulting light reflected from a light-reflective magnetic layer 4.

Further, in a like manner, recording and/or reproduction of information on or from the optical recording layer 7 is performed by projecting a light beam suitable for a recording or reproducing operation onto the optical recording layer 7 from above in the drawing.

Furthermore, recording and/or reproduction of information onto a light-reflective magnetic layer 4 is performed by a magnetic head (not shown) through an optical recording layer 7 which is comparatively thin.

With the structure of the second embodiment wherein two optical recording layers (optical recording layers 3, 7) are employed, a storage capacity thereof can be further increased compared with that of the first embodiment.

Figure 3:
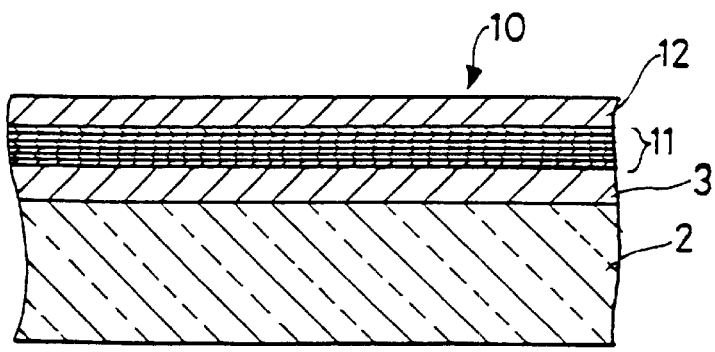
Figure 4A:
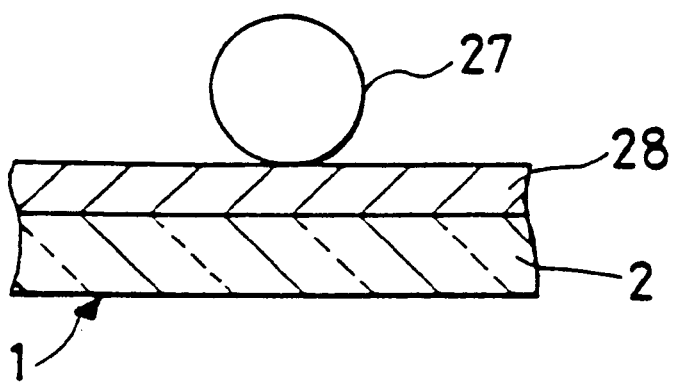
FIG. 4(a) to FIG. 4(d) are schematic vertical sectional views respectively showing manufacturing processes of the optical tape.
Figure 4B:
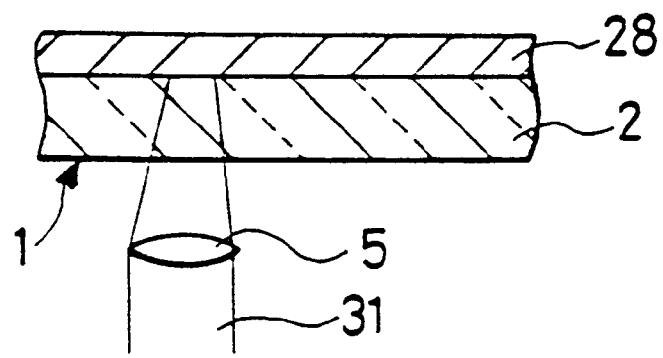
Figure 4C:
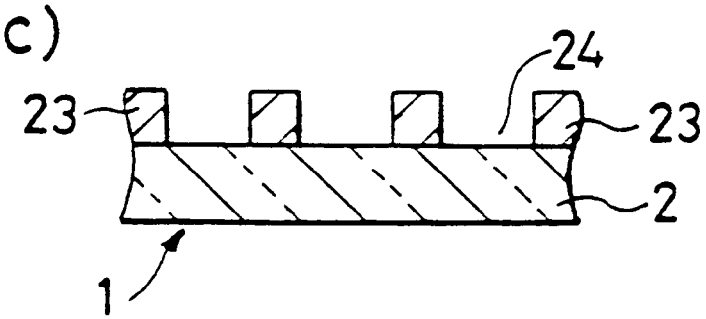
Figure 4D:
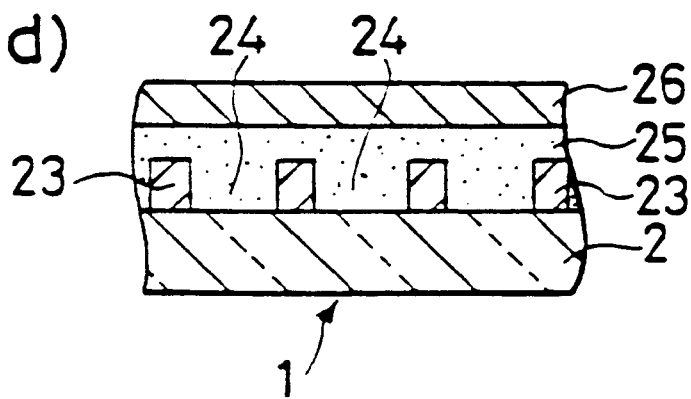

Next, the following description will discuss a third embodiment referring to FIG. 3.

An optical tape 10 of the third embodiment comprises a film substrate 2 having light transmission characteristic, and an optical recording layer 3 made of photochromic material is installed on the substrate 2 by means of spattering or other processes. Further, a light-reflective magnetic layer 11 made of Pt/Co multi-layer film is disposed on the optical recording layer 3. The light-reflective magnetic layer 11, on the one hand functions as a reflective layer in the case of performing recording or reproduction on or from the optical recording layer 3, and on the other hand, serves itself as a medium on which information is recorded by magneto-optical recording method. Additionally, in the present specification, magneto-optical recording method is considered as one of magnetic recording methods.

On the light-reflective magnetic layer 11, is formed a protective layer 12 which is made of ultraviolet-hardening type resin which hardened after having been coated, and thereby the optical recording layer 3 and the light-reflective magnetic layer 11 are protected in a sealed state by the protective layer 12 and the substrate 2.

With the above structure, recording of information onto the optical recording layer 3 is performed by projecting a light beam for recording onto the optical recording layer 3 through the substrate 2, while reproduction of information from the optical recording layer 3 is performed by projecting through the substrate 2 a light beam with a luminous intensity or a wavelength by which no information can be recorded on the optical recording layer 3 and by utilizing a resulting light reflected from the light-reflective magnetic layer 11.

On the other hand, magneto-optical recording of information onto the light-reflective magnetic layer 11 is performed by applying a magnetic field through the protective layer 12 while projecting onto the light-reflective magnetic layer 11 from the protective layer 12 side or the material base 2 side a light beam by which no information can be recorded on the optical recording layer 3. As to reproduction of information recorded on the light-reflective magnetic layer 11, it is performed by projecting a light beam from the protective layer 12 side or the material base 2 side and by detecting a reflected light back from the light-reflective magnetic layer 11 or a transmitted light through the light-reflective magnetic layer 11.

Additionally, in the second and third embodiments, the description was given of an optical tape, yet it is obvious that the contents of the embodiments are applicable to other optical recording media such as optical disks or optical cards.

As described above, the optical recording medium of the present invention comprises a substrate, an optical recording layer formed on the substrate, whereon recording is optically performed, and a light-reflective magnetic layer from which a light beam projected onto the recording layer is reflected and on which magnetic recording is performed. Therefore, since a light-reflective layer for use in reflection type optical recording is modified to form a light-reflective magnetic layer so as to add another function as a magnetic layer, the arrangement permits magnetic recording independently on the light-reflective layer of an optical recording medium, while permitting optical recording on the the optical recording layer thereof. Accordingly, a storage capacity of the optical recording medium can be increased compared with that of a conventional type having only an optical recording layer formed thereon. Having an increased recording capacity is advantageous, for example, in performing long-time recording of video information, music information or the like or duplicated recording of information.

The following description will discuss guiding grooves formed on an optical tape, for providing tracking control, referring to FIGS. 4 and S. Additionally, those of the members having the same functions and described in the first embodiment are indicated by the same reference numerals and the description thereof is omitted.

As illustrated in FIG. 4 (d) as a cross-sectional view taken across line D—D (see FIG. 5), an optical tape 1 (optical recording medium) of the present embodiment includes a film substrate 2 on which guiding groove shaping members 23 are fixed at predetermined intervals such that guiding grooves 24 as recording paths for information are formed between the adjacent guiding groove shaping members 23.

Figure 5:
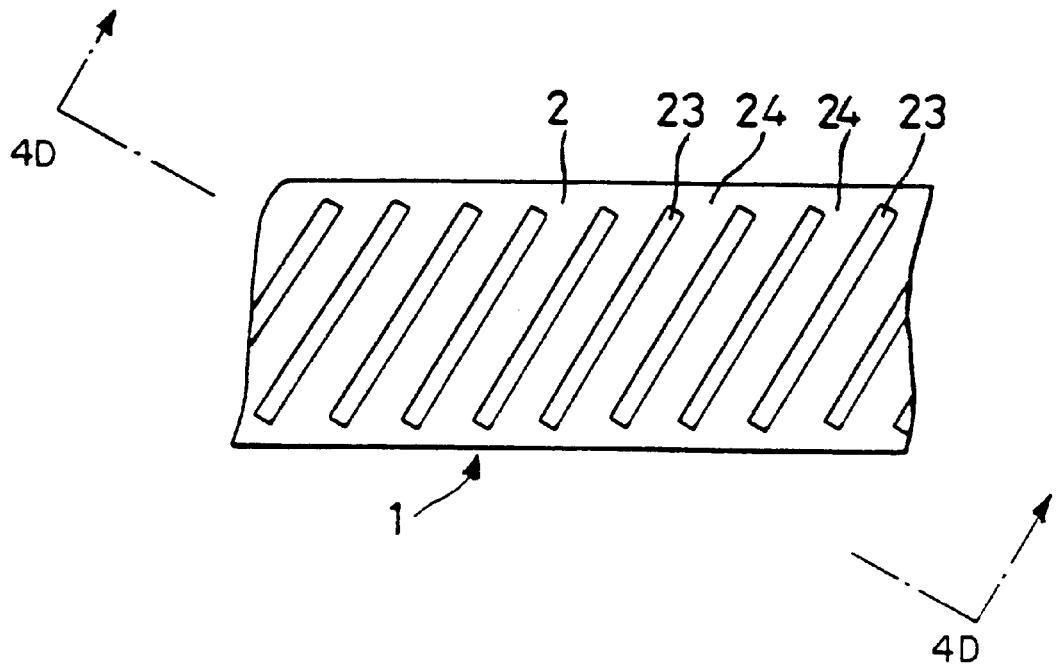

As shown in FIG. 5, the guiding grooves 24 are formed in a direction slanting to the longitudinal direction of the optical tape 1. Further, as shown in FIG. 4 (d), a layer of a recording medium 25 is formed on the guiding grooves 24 and the guiding groove shaping members 23, and the recording medium 25 is coated with a protective layer 26.

The following description will discuss one example of fabricating processes of the optical tape 1 in detail.

As shown in FIG. 4 (a), firstly, an elongated film substrate 2 made of polymeric resin such as polyethylene terephthalate, having light transmission and heatproof characteristics, is prepared, and the substrate 2 is uniformly coated with a layer 28 of the guiding groove shaping material, made of ultraviolet-hardening type resin, using a roller 27 or other device.

Next, as shown in FIG. 4 (b), an ultraviolet ray 31, focused to a point of light by a converging lens 5, is projected through the substrate 2 to an area corresponding to a portion between the adjacent guiding grooves 24 on the layer 28. Additionally, at this time, an index pattern indicating a number or other factors of a track which is disposed by guiding grooves 24, can be simultaneously formed by the exposure.

Figure 6:
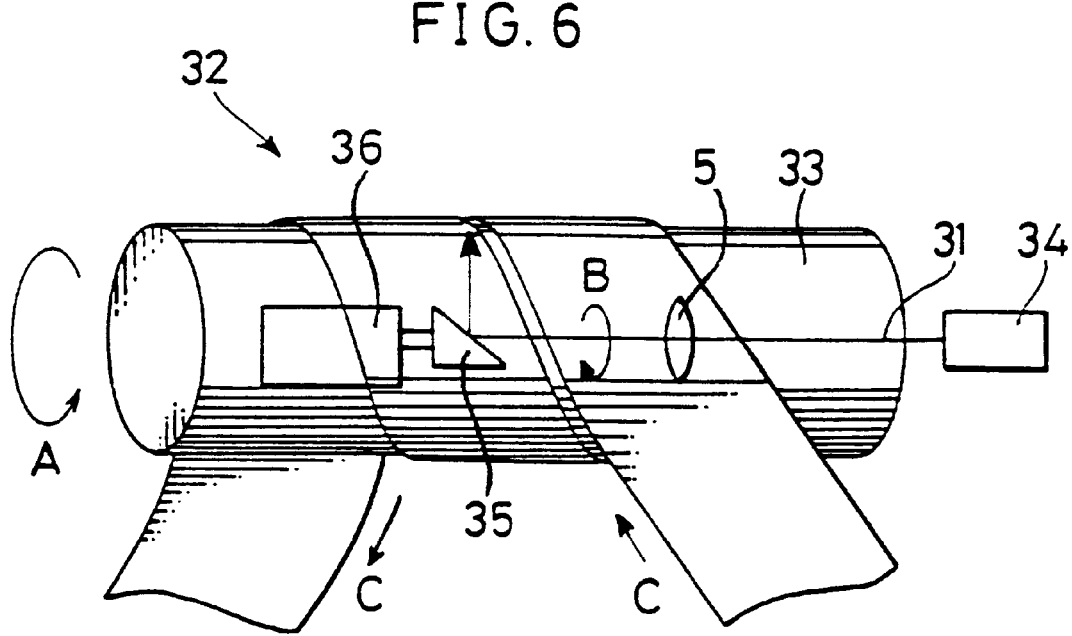

Here, FIG. 6 shows one example of an exposure device 32 for permitting the exposure by the ultraviolet ray 31. The exposure device 32 comprises a transparent hollow cylinder 33 capable of rotating in a direction indicated by an arrow A, supported by a driving section (not shown), a light source 34 for projecting the ultraviolet ray 31 along a central axis of the cylinder 33, a mirror 35 (ultraviolet ray propagating direction changing means) for reflecting the ultraviolet ray 31, for example, at right angles, disposed inside the cylinder 33, and a motor 36 (driving means) for rotating the mirror 35 about the central axis of the cylinder 33 in a direction indicated by an arrow B.

An optical tape 1 provided thereon with the substrate 2 on which the layer 28 of guiding groove shaping material is formed, is helically wrapped around the cylinder 33 without overlapping with each other, with the substrate 2 disposed inside. While sending the optical tape 1 to a direction indicated by an arrow C by rotating the cylinder 33 in the direction indicated by the arrow A, the ultraviolet ray 31 being projected from the light source 34 is reflected by the mirror 35 being rotated by the motor 36 in the direction indicated by the arrow B, and thereby projected on the layer 28 of the guiding groove shaping material through the cylinder 33 and the substrate 2. With the arrangement, as shown in FIG. 5, the exposure is performed according to a pattern of the guiding groove shaping members 23 disposed in a direction slanting to a longitudinal direction of the optical tape 1, and a resulting exposed portion thereof is permitted to harden.

Thereafter, by removing a portion not irradiated by the ultraviolet ray 31 on the layer 28 of the guiding groove shaping material using an organic solvent or the like, the guiding grooves 24 are formed as is illustrated in FIG. 5 and in FIG. 4 (c) as an enlarged sectional view of FIG. 5 taken across line D—D. Thus, between guiding grooves 24 there remain the guiding groove shaping members 23 which are portions irradiated by the ultraviolet ray 31. Moreover, as described above, if another pattern for indicating such as numbers of tracks formed by the guiding grooves 24 has been simultaneously exposed, such pattern indicating such as track numbers remains together with the guiding groove shaping members 23.

Following the process, a recording medium 25 is formed in a laminated state on the guiding grooves 24 and the guiding groove shaping members 23, as is shown in FIG. 4 (d). The recording medium 25 is composed of a material whereby optical recording and reproduction are operable utilizing its magneto-optical effect or photochromic phenomenon. For example, in the case of recording utilizing the magneto-optical effect, a thin film or the like of rare earth transition metal alloy is employed as the recording medium 25, while in the case of recording utilizing the photochromic phenomenon, a thin film or the like having a composition wherein a kind of derivative of fulgide form, α-2,5-dimethyl-3-furylethylidene-isopropylidene succinic anhydride is dispersed in PMMA, is employed.

Next, a protective layer 26 is formed on the recording medium 25 using ultraviolet-hardening type resin or the like. Additionally, the protective layer 26 is designed to coat the recording medium 25 at both sides thereof in the transverse direction of the optical tape 1, and thereby the recording medium 25 is sealed by the protective layer 26 and the substrate 2.

In the above arrangement, recording or reproduction of information on or from the recording medium 25 shown in FIG. 4 (d) is performed along the guiding grooves 24. For example, in the case of using as the recording medium 25 a medium on or from which recording or reproduction is performed by utilizing the magneto-optical effect, in recording, a magnetic field is applied in the vertical direction to a film surface of the recording medium 25 while projecting a light beam such as a laser beam so as to lower coercive force of the recording medium 25, whereby the direction of magnetization is set either in the upward or downward direction shown in FIG. 4 (d) according to information to be recorded. On the other hand, in reproduction, a light beam whose luminous intensity is smaller than that in recording is projected, and since its plane of polarization is rotated according to a direction of magnetization, information is reproduced by detecting the rotation direction of the plane of polarization.

Moreover, in the case of using as the recording medium 25 a medium on or from which recording or reproduction is performed by utilizing the photochromic phenomena, in recording, a laser beam or the like with a predetermined wavelength is projected, and by utilizing the resulting change of refractive index which occurs at the irradiated portion, recording of information is performed, while in reproduction, by projecting a laser beam whose wavelength is different from that of the recording beam, reproduction of information is performed.

In recording or reproduction, a light beam is directed to focus on a center of a guiding groove 24 as a recording path. In that case, since the intensity of the transmitted light differs between areas of the guiding grooves 24 and the guiding groove shaping members 23, tracking control is provided based on the intensity of the transmitted light, and the light beam can be directed to focus on the center of the relevant guiding groove 24 on or from which an instantaneous recording or reproduction is performed.

In addition, as the recording medium 25, a recording medium such as that of phase change type or other type may be used besides the above-mentioned.

Figure 7:
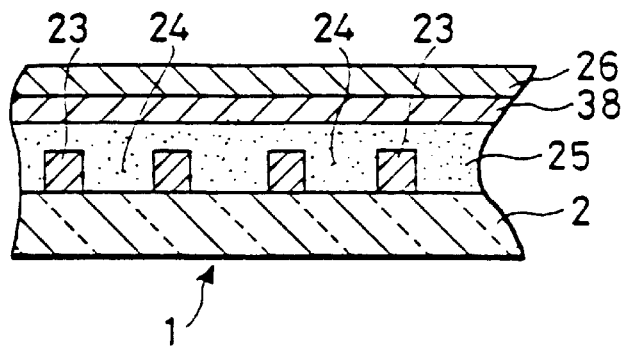

Moreover, in the above embodiment, the description is given of an optical tape of transmission type where recording or reproduction is performed by transmitting light from the substrate 2 side to the protective layer 26 side, yet in lieu of the arrangement, the present invention is applicable to an optical tape of reflection type which comprises an reflective layer 38 formed between the recording medium 25 and the protective layer 26 as shown in FIG. 7, and where recording or reproduction is performed by reflecting a light beam projected from the substrate 2 side, back from the reflective layer 38. Additionally, as to construction members of the optical tape shown in FIG. 7, those of the members having the same functions as those shown in FIG. 4 (d) are indicated by the same reference numerals and the description thereof is omitted.

Furthermore, in the above embodiment, the layer 28 of the guiding groove shaping material is made up of ultraviolet-hardening type resin, yet in lieu of the composition the layer 28 of the guiding groove shaping material may be made up of photo-resist of positive type or negative type, and the guiding grooves 24 may be formed by developing the photo-resist after drawing a pattern of the guiding grooves 24 on the photo-resist using a light beam or after exposing the pattern through a photomask. In that case, the remaining photo-resist forms the guiding groove shaping members 23.

As aforementioned, the optical tape in accordance with the present invention comprises a film substrate, guiding groove shaping members to form guiding grooves as recording paths for information, disposed on the substrate, and a recording medium on which optical recording is performed. With the arrangement, a light beam may be accurately led to focus on a recording path for information using a guiding groove as a reference position. As a result, recording and reproduction of information may be performed accurately. Further, for an optical head for use with the optical tape, it is only necessary to include a light source, a photodetector and other devices for information recording and reproduction, and therefore the number of parts for use in the optical head can be reduced.

Moreover, the present invention discloses a manufacturing method of the optical tape wherein: a layer of guiding groove shaping material with photosensitivity is formed on the film substrate; next, after having exposed a pattern of guiding grooves on the layer of guiding groove shaping material, the portion corresponding to guiding grooves is removed from the layer; and subsequently a recording medium for allowing optical recording to be performed thereon is formed on the resulting guiding groove forming members and guiding grooves formed between those members. With the arrangement, the formation of guiding grooves in an optical tape can be performed accurately and easily.

Figure 8:
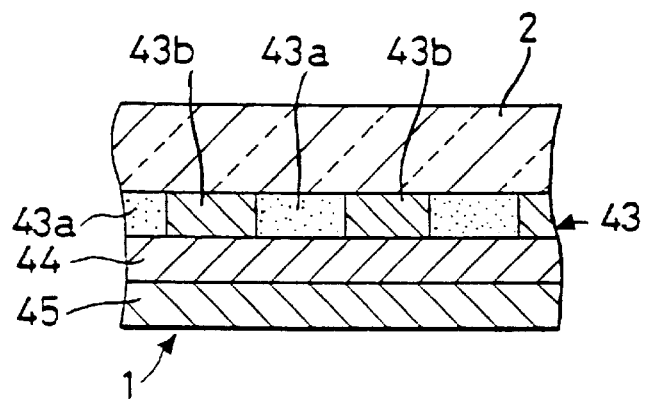
Figure 9:
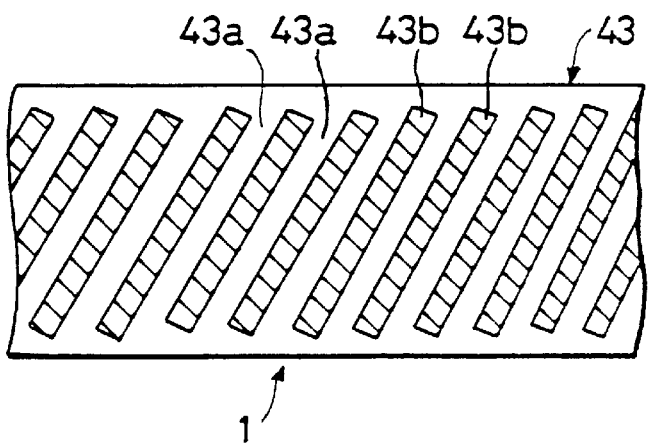

Referring to FIGS. 8 and 9, the following description will discuss an example to show how a guide track pattern may be formed by projecting a laser beam on a photochromic material so as to excite it and allowing its refractive index to be changed. Additionally, those of the members having the same functions as the aforementioned embodiment are indicated by the same reference numerals and the description thereof is omitted.

An optical tape 1 to be disclosed hereinafter comprises a film substrate 2 (for example, with a thickness of substantial several tens of μm). The substrate 2 is made up of, for example, polymeric resin such as polyethylene terephthalate, having light transmission and heatproof characteristics. On the substrate 2, is disposed a photochromic layer 43 made up of a suitable photochromic material having a composition wherein a kind of derivative of fulgide form, for example, α-2,5-dimethyl-3-furylethylidene-isopropylidene succinic anhydride is dispersed in PMMA. The photochromic material is excited by a laser beam from a He-Cd laser with a wavelength of 325 μm, and has a change of its refractive index at an irradiated portion 43b thereof (shown by the hatching portion for convenience) caused by the laser beam.

Here, if a refractive index of a non-irradiated portion 43a on the photochromic layer 43 is $n_1$; a refractive index of an irradiated portion 43b is $n_2$; a thickness of the photochromic layer 43 is d; and a wavelength of light to be used in recording or reproducing information on or from a recording layer 44 which will be described later, is λ, in order to permit tracking control based on a difference between the refractive indexes $n_1$ and $n_2$ of the non-irradiated portion 43a and irradiated portion 43b, the following equation should be satisfied:

$$\lambda/16 \leq |n_1-n_2| \times d \leq \lambda/4,$$

preferably, $$|n_1-n_2| \times d \approx \lambda/8$$

The recording layer 44 for allowing optical recording to be performed thereon is formed on the photochromic layer 43. The recording layer 44 is composed of a preferable material for enabling optical recording such as a rare earth transition metal alloy layer for enabling recording and reproduction of information based on the magneto-optical effect, a phase change layer for permitting recording and reproduction by utilizing phase change, or a second photochromic layer made up of a photochromic material different from the photochromic layer 43.

The recording layer 44 is provided thereon with a protective layer 45 made up of, for example, ultraviolet-hardening type resin, and the photochromic layer 43 and the recording layer 44 are thus sealed by the substrate 2 and the protective layer 45.

Moreover, although not shown in the drawings, an optical head for performing recording and reproduction with respect to the optical tape 1, comprises a laser for recording and reproduction which projects a laser beam onto the recording layer 44 through the substrate 2 and the photochromic layer 43, a photodetector or other device for receiving the laser beam after transmitted through the recording layer 44 and further through the protective layer 45. Furthermore, a formatting-use laser which forms a guide track pattern so as to provide formatting by exciting the photochromic layer 43 and changing a refractive index thereof, is installed either in the optical head or in a place other than the optical head. Additionally, the laser for recording and reproduction generates a laser beam having a wavelength or a luminous intensity whereby no excitation may occur in the photochromic layer 43, while the formatting-use laser generates a laser beam having a wavelength and a luminous intensity whereby no recording is possible on the recording layer 44.

In the above arrangement, after fabricating the optical tape 1, prior to performing a recording operation, firstly a laser beam is projected by the formatting-use laser onto the photochromic layer 43 so as to form a guide track pattern, thereby executing formatting. More concretely, for example, as shown in FIG. 9, the projection is performed with predetermined intervals in a direction slanting to the longitudinal direction of the optical tape 1 by a predetermined angle, and thus an irradiated portion 43b having a refractive index different from that of non-irradiated portion 43a is formed. Either the resulting irradiated portion 43b or non-irradiated portion 43a forms a guide track. More specifically, guide tracks of phase type are formed by utilizing a phase difference between transmitted laser beams of the irradiated portion 43b and non-irradiated portion 43a.

In addition, the guide tracks may be preliminarily formed on the entire area of the optical tape 1, or by incorporating the formatting-use laser in the optical head, the guide track may be formed only in an area for instantaneous recording immediately before recording of information is executed on the area. Moreover, in forming the guide tracks, if necessary, an index pattern indicating such as guide track numbers may be recorded on the photochromic layer 43.

After forming the guide tracks on the photochromic layer 43, recording of information is performed on the recording layer 44 by the laser for recording and reproduction according to the guide tracks. At this time, for example, if the non-irradiated portion 43a on the photochromic layer 43 serves as guide tracks, tracking control is performed based on a difference of the refractive indexes between the non-irradiated portion 43a and irradiated portion 43b so that a light beam is directed to focus on a center of a non-irradiated portion 43a in the recording layer 44 as a guide track where an instantaneous recording operation is about to start, and thereby recording of information is executed on a position corresponding to the non-irradiated portion 43a on the recording layer 44.

On the other hand, also in reproduction, the tracking control is performed so as to direct the light beam onto a center of a guide track, in the same manner as in recording.

As described above, in the example disclosed here, it is arranged that the guide track pattern is recorded on the photochromic layer 43 disposed separately from the recording layer 44. Therefore, reduction of recording density for information on the recording layer 44 is avoidable, and on the other hand, tracking control can be performed according to the laser beam for performing recording or reproduction on or from the recording layer 44.

Figure 10:
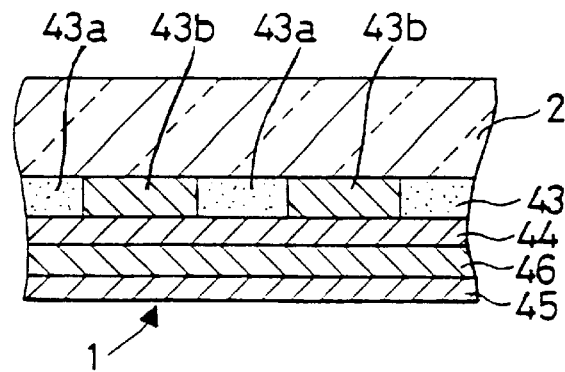

In the above example, it is arranged that reproduction of information may be performed based on transmitted light through the optical tape 1, yet as shown in FIG. 10, another arrangement is possible wherein a reflective layer 46 is disposed between the recording layer 44 and the protective layer 45, and based on reflected light from the reflective layer 46, reproduction of information may be executed. Additionally, as to construction members of the optical tape shown in FIG. 10, those of the members having the same functions as those shown in FIG. 8 are indicated by the same reference numerals and the description thereof is omitted.

As described above, the optical tape in accordance with the present invention comprises a substrate, a photochromic layer for permitting a guide track pattern to be recorded thereon, and a recording layer for enabling optical recording of information to be executed thereon.

In the arrangement, the photochromic layer is formed on the optical tape in addition to the recording layer, and the guide track pattern is recorded on the photochromic layer. Therefore, recording and reproduction of information are performed effectively by providing accurate tracking control with respect to the optical tape, and the arrangement may be achieved by installing only an additional light source for recording the guide track pattern on the photochromic layer along with a light source, photodetector and other devices for performing recording and reproduction of information. Further, since the light source for recording the guide pattern is not necessarily installed in the optical head, the number of parts required for the optical head may be reduced.

Moreover, since only information is recorded on the recording layer, reduction of recording density for information may be avoidable.

The invention being thus described, it may be obvious that the same may be varies in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A method for recording and reproducing on and from an optical recording medium, comprising:

providing an optical recording medium that comprises 1) a substrate, 2) an optical recording layer to which light is directed so as to carry out optical recording, the optical recording layer being formed on the substrate, and 3) a light-reflective magnetic layer which reflects the light directed to the optical recording layer and carries out magnetic recording;

performing recording of information by focusing a recording light beam on the optical recording layer through a converging lens from a substrate side and changing a refractive index of a light-focused portion on the optical recording layer;

performing magnetic recording on the light-reflective magnetic layer by a magnetic head;

performing reproduction of recorded information by projecting on the optical recording layer a reproducing light beam having a wavelength or a luminous intensity whereby no recording of information may be performed on the optical recording layer and detecting a reflected light from the light-reflective magnetic layer; and reproducing information magnetically recorded on the light-reflective magnetic layer by the magnetic head.

2. The method of claim 1 further comprising a magnetic head for recording and reproducing on and from the magnetic layer.

3. The method of claim 1 wherein the medium is an optical tape, an optical disk or an optical card.

4. A method for recording and reproducing on and from an optical recording medium, comprising:

providing an optical recording medium that comprises 1) a substrate, 2) an optical recording layer to which light is directed so as to carry out optical recording, the optical recording layer being formed on the substrate, 3) a light reflective magnetic layer which reflects the light directed to the optical recording layer and carries out information recording by magneto-optical recording, and 4) a protective layer for protecting the light-reflective magnetic layer, said optical recording medium being designed so that the optical recording layer and the light-reflective magnetic layer are protected by the substrate and the protective layer;

recording first information on an optical recording layer by projecting a laser beam for recording through the substrate;

recording second information on the light-reflective magnetic layer magneto-optically, by applying a magnetic field thereon through a protective layer while projecting a laser beam on the light-reflective magnetic layer from the protective layer side or from the substrate side;

performing reproduction of the recorded first information by projecting on the optical recording layer a laser beam having a wavelength or luminous intensity whereby no recording may be performed on the optical recording layer and detecting a reflected light from the light-reflective magnetic layer; and performing reproduction of the second information recorded on the light-reflective magnetic layer magneto-optically, by projecting on the light-reflective magnetic layer from the protective layer side or the substrate side a laser beam having a wavelength or a luminous intensity whereby no recording may be performed on the light-reflective magnetic layer.

5. The method of claim 4 further comprising a magnetic head for recording and reproducing on and from the magnetic layer.

6. The method of claim 4 wherein the medium is an optical tape, optical disk or an optical card.

7. A method for recording and reproducing on and from an optical recording medium, comprising:

providing an optical recording medium that comprises 1) a base substrate for an optical recording medium, 2) a guide layer for recording a guide-track pattern for carrying out tracking control, and 3) a recording layer for magneto-optically recording information, providing a format on the optical recording medium substrate by projecting a formatting-use laser beam on the optical recording medium substrate and forming a guide track pattern on a photochromic layer;

recording information on the recording layer by providing tracking control to permit a laser beam for recording and reproduction to be positioned at a center of a guide track; and reproducing information recorded on the recording layer by providing tracking control to permit a laser beam for recording and reproduction to be positioned at a center of a guide track.

8. A method for recording and reproducing of claim 7, wherein the tracking control is performed based on a phase difference between transmitted light beams from an irradiated portion where the formatting-use laser beam was projected and from a non-irradiated portion, the phase difference being caused by a difference of refractive indexes between those two portions.

9. The method of claim 7 further comprising a magnetic head for recording and reproducing on and from the magnetic layer.

10. The method of claim 7 wherein the medium is an optical tape, an optical disk or an optical card.

11. A method for recording on an optical recording medium, comprising,
   (a) providing an optical recording medium that comprises 1) a substrate, 2) a light-transmitting optical recording and reproducing layer, formed on the substrate, 3) a light-reflective magnetic layer for magnetically recording and reproducing thereon, and for reflecting an incident light beam back through the light-transmitting optical recording and reproducing layer, and 4) a second optical recording and reproducing layer formed on the light-reflective magnetic layer,
   (b) projecting a first light beam on the light-transmitting optical recording and reproducing layer for optically recording thereon; and
   (c) projecting a second incident light beam on the second optical recording and reproducing layer for optically recording thereon.

12. The method of claim 11 further comprising a magnetic head for recording on the magnetic layer.

13. The method of claim 11 wherein the medium is an optical tape, an optical disk or an optical card.

14. A method for reproducing from an optical recording medium, comprising,
   (a) providing an optical recording medium that comprises 1) a substrate, 2) a light-transmitting optical recording and reproducing layer, formed on the substrate, 3) a light-reflective magnetic layer for magnetically recording and reproducing thereon, and for reflecting an incident light beam back through the light-transmitting optical recording and reproducing layer, and 4) a second optical recording and reproducing layer formed on the light-reflective magnetic layer,
   (b) projecting a first light beam on the light-transmitting optical recording and reproducing layer for optically reproducing therefrom; and
   (c) projecting a second incident light beam on the second optical recording and reproducing layer for optically reproducing therefrom.

15. The method of claim 14 further comprising a magnetic head for reproducing from the magnetic layer.

16. The method of claim 14 wherein the medium is an optical tape, an optical disk or an optical card.

17. The method of claim 7, wherein the guide layer is a photochromic layer.

* * * * *

UNITED STATES PATENT AND TRADEMARK OFFICE
CERTIFICATE OF CORRECTION

PATENT NO. : 5,989,671
DATED : November 23, 1999
INVENTOR(S) : Junichiro Nakayama, et al It is certified that error appears in the above-identified patent and that said Letters Patent is hereby corrected as shown below:

On the Cover page, column 1, section [75], line 4, please replace "Hara" with --Nara--.

Signed and Sealed this

Eighteenth Day of July, 2000

*Attest:*

Q. TODD DICKINSON

*Attesting Officer*  Director of Patents and Trademarks